Patented Oct. 21, 1924.

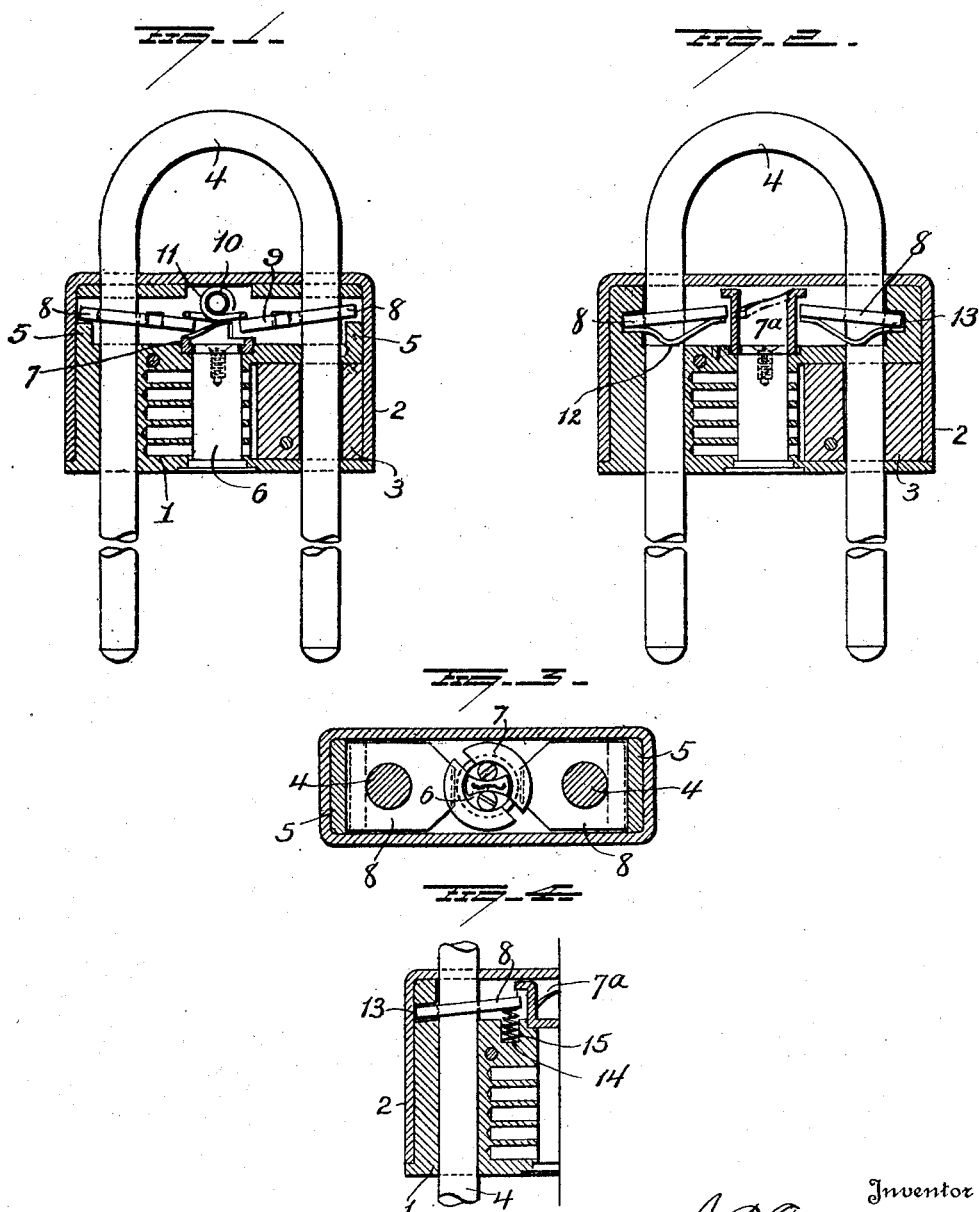

1,512,590

UNITED STATES PATENT OFFICE.

JOHN B. FREYSINGER, OF STAMFORD, CONNECTICUT, ASSIGNOR TO THE YALE & TOWNE MANUFACTURING COMPANY, OF STAMFORD, CONNECTICUT.

PADLOCK.

Application filed March 5, 1923. Serial No. 622,954.

*To all whom it may concern:*

Be it known that I, JOHN B. FREYSINGER, a citizen of the United States, and a resident of Stamford, in the county of Fairfield and State of Connecticut, have invented certain new and useful Improvements in Padlocks; and I do hereby declare the following to be a full, clear, and exact description of the invention, such as will enable others skilled in the art to which it appertains to make and use the same.

This invention relates to improvements in padlocks having reference particularly to that type in which the shackle is adjustable.

One object of my present invention is to so construct an adjustable-shackle padlock that the shackle may be secured against outward movement from any position to which it may have been adjusted relatively to the lock casing, with the use of friction clutch devices embracing the legs of the shackle, and to provide simple and efficient key-controlled means for operating said clutch devices to release the shackle.

With this and other objects in view, the invention consists in certain novel features of construction and combinations of parts as hereinafter set forth and pointed out in the claims.

In the accompanying drawings,—

Figure 1 is a view partly in section and partly in elevation illustrating an embodiment of my invention.

Figure 2 is a similar view showing a modified form.

Figure 3 is a view in transverse section of the structure shown in Figure 2, and Figure 4 is a view illustrating another modification.

In Figure 1 of the drawing, I have shown a key-operated mechanism in the form of a cylinder lock 1, located within the casing 2 of the padlock and a filler block 3 may also be disposed within said casing. The cylinder member of the lock and the filler block are suitably secured within the casing 2 and both are provided with suitable openings aligning with openings in the casing 2 for the accommodation of the legs of a shackle 4. Adjacent to the respective legs of the shackle, the cylinder or frame member of the lock or key-operated mechanism is provided with up-standing lugs 5 for a purpose hereinafter explained.

The revoluble member or plug 6 of the key-operated mechanism has secured thereto a cam head 7 to cooperate with clutch members 8. Each of these clutch members is made in the form of a ring which embraces a leg of the shackle and these ring clutch members may be provided with lugs or projections 9 to cooperate with the cam head 7. A pin 10 is located within the casing 2 above the cam head 7 and about this pin a spring 11 is coiled,—the respective ends of this spring bearing respectively upon the lugs or projections 9 of the ring clutch members 8 and serving to press the latter in a direction to clutch the shackle legs and prevent outward movement of the shackle. It will be observed that the clutch members project over the lugs 5 on the cylinder or frame of the key-operated mechanism and that when a key is inserted into the revoluble member 6 of said mechanism and turned, cooperation of the cam head with the clutch rings will raise the latter (said clutch rings resting upon the lugs 5) which constitute abutments for the same and unclutch the legs of the shackle, permitting the latter to be moved outwardly.

The construction shown in Figures 2 and 3 is similar to that shown in Figure 1, the principal differences being that in the construction shown in Figures 2 and 3, the cam head 7ª is slightly different in form; the clutch rings are not necessarily provided with inwardly projecting lugs; springs 12 are disposed under the clutch rings and adapted to normally press the same to clutching positions, and the clutch members project into recesses 13 in the lock frame within the casing 2, the upper walls of said recesses constituting abutments for said clutch rings.

In the form of the invention shown in Figure 4, the clutch members may be mounted in recesses 13, the same as shown in Figure 2 and the cam head 7ª may also be of the same form as that shown in Figure 2. In the Figure 4 construction, a socket 14 is made in the lock cylinder or frame 1 and receives a spring 15, the upper end of which bears against the clutch member 8 and presses the latter normally into locking position relatively to the shackle legs.

Having fully described my invention what I claim as new and desire to secure by Letters-Patent, is:

1. In a padlock, the combination with a casing and a shackle, of a ring clutch embracing a member of the shackle within the casing, spring means cooperating with said ring clutch to press the same in a direction to clutch said member of the shackle and hold the latter against outward movement, key-actuated means cooperable with said ring clutch to move the same in a direction to release the shackle, and an abutment in the casing for said clutch ring when the latter is moved by the key-actuated means to release the shackle.

2. In a padlock, the combination with a casing, a shackle having legs movable through said casing, and key-controlled means within the casing, of ring clutches within the casing and embracing the legs of the shackle, abutments in the casing for said ring clutches, a cam head rigid with the revoluble member of the key-controlled means and cooperable with said ring clutches to move them to unclutching positions, and spring means located within the casing and cooperable with said ring clutches to move them to clutching positions to hold the shackle against outward movement.

In testimony whereof, I have signed this specification in the presence of two subscribing witnesses.

JOHN B. FREYSINGER.

Witnesses:
   CHARLES LEDIN,
   CHARLES A. BERRY.